(12) United States Patent
Tseitlin et al.

(10) Patent No.: US 7,349,685 B2
(45) Date of Patent: Mar. 25, 2008

(54) METHOD AND APPARATUS FOR GENERATING SERVICE BILLING RECORDS FOR A WIRELESS CLIENT

(75) Inventors: Eugene R. Tseitlin, Northbrook, IL (US); Leopold A. Alonso, Barrington, IL (US); Barry M. Kogan, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 325 days.

(21) Appl. No.: 11/253,036

(22) Filed: Oct. 18, 2005

(65) Prior Publication Data
US 2007/0087727 A1    Apr. 19, 2007

(51) Int. Cl.
*H04M 11/00*    (2006.01)
(52) U.S. Cl. .................. 455/406; 455/411; 455/432.3; 455/433; 455/435.1; 455/435.2; 455/435.3; 455/410; 370/352
(58) Field of Classification Search ................ 455/406, 455/411, 432.2, 433, 435.1, 435.2
See application file for complete search history.

(56) References Cited

U.S. PATENT DOCUMENTS

| 5,745,884 A | 4/1998 | Carnegie et al. |
| 2002/0029197 A1 | 3/2002 | Kailamaki et al. |
| 2002/0068545 A1 | 6/2002 | Oyama et al. |
| 2003/0037005 A1 | 2/2003 | Nakaoka et al. |
| 2003/0051041 A1 | 3/2003 | Kalavade et al. |
| 2004/0235455 A1* | 11/2004 | Jiang .......................... 455/411 |

FOREIGN PATENT DOCUMENTS

| WO | WO 01/91003 A2 | 11/2001 |
| WO | WO 02/21865 A1 | 3/2002 |

* cited by examiner

*Primary Examiner*—David Q. Nguyen

(57) ABSTRACT

A method and apparatus for generating service billing records for a wireless client. According to one embodiment of the invention, a service status of the wireless client is obtained (706) for authentication upon receiving (704) an authentication request from a wireless client. When the wireless client has been, in fact, authenticated, an open token is accordingly sent (730) to the wireless client for access to at least one service.

12 Claims, 10 Drawing Sheets

US 7,349,685 B2

METHOD AND APPARATUS FOR GENERATING SERVICE BILLING RECORDS FOR A WIRELESS CLIENT

FIELD OF THE INVENTION

The present invention generally relates to the field of wireless communications, and more particularly relates to generating service billing records for a wireless client.

BACKGROUND OF THE INVENTION

Wireless subscriber units continue to expand in function and features as wireless technology develops. Multiple services can now be performed on a single wireless subscriber unit. Examples of multiple services include telephone service, dispatch service, and packet data service. Further, these wireless services can include communications between wireless subscribe devices using a central call processing switch and services enabling point-to-point communications between wireless devices without going through a call processing switch. An advantage to a multi-service wireless device is the ability to communicate with a number of different types of devices using various wireless services e.g. cellular, satellite, point-to-point, and others. The availability of multi-service wireless services is not without its challenges. One challenge is to correctly bill for of each service.

For example, FIG. 1 illustrates a current system 100 with a centralized call processing server 110 that is used for allowing wireless subscriber units 102, 104, 106, 108 to communicate with each other. The wireless subscriber units 102, 104, 106, 108 communicate with each other by setting up the connection through the call processing server 110. The call processing server 110 then communicates with the location server 112 to locate the party to the connection. A billing server 114 communicates with the call processing server 110 and records all billing information for the wireless subscriber units 102, 104, 106, 108. This system 100 enables traditional billing methods for wireless data, such as voice calls or instant messaging, in services where the wireless subscriber units using a wireless network and for services in which the wireless network is only used for call setup to enable point-to-point, such as Internet Protocol ("IP") based calls between wireless subscriber units.

FIG. 2 illustrates another system 200 with a first centralized call processing server 214 that is currently used for allowing wireless subscriber units 202, 204, 206, 208, 210, 212 to communicate with and locate a peer wireless subscriber unit communicatively coupled to a second centralized call processing server 216. The wireless subscriber units 202, 204, 206 must register with the call processing server 214. Similarly, the wireless subscriber units 208, 210, 212 must register with the call processing server 216. In the case where a wireless subscriber unit 202, 204, 206, 208, 210, 212 wirelessly communicates with another unit registered with the same call processing server 214, 216, the system performs as described in FIG. 1. However, in the case where the wireless subscriber unit 202, 204, 206, 208, 210, 212 wirelessly communicates with a peer unit registered on a different call processing server 214, 216, the call processing server 214, 216 must communicate with a proxy server 218. The proxy server 218 communicates with the other call processing server 214, 216 and locates the peer unit.

Setting up a connection through a call processing server is inefficient because traffic flow problems are created. A call processing server has a limited capacity for the amount of traffic that the server can process. The lack of resources in the call processing server creates a bottleneck effect which hinders network performance. Additionally, when the connection is setup through a call processing server, security becomes an issue because the wireless subscriber units are not communicating directly with each other. The call processing server needs to take additional steps, for example, encryption, to ensure a secure connection between the wireless subscriber units. The additional steps further reduce the resources available on the call processing server and add to the bottleneck effect.

As discussed above, the wireless subscriber units are multi-service capable and one of those services is direct peer-to-peer communication. In the case where the service is a direct point-to-point communication between two or more wireless subscriber units, billing for such service is very difficult to provide. It is not uncommon for the call setup to go through multiple servers and often times multiple entities when providing direct peer-to-peer communication. This complexity makes billing security from one wireless subscriber unit to another wireless subscriber unit difficult.

In the case of direct peer-to-peer communication between wireless subscriber units, however, a centralized server is not always involved in the connection setup in the case when a user of a wireless unit previously obtained a direct address of another wireless subscriber unit. Since the wireless subscriber units communicate with each other directly with the initial call connection setup by a call processing server, billing the units for time usage is very difficult. The units are usually billed by the number of bits transmitted or just a flat rate fee. When billing by the amount of bits transmitted, unstable coverage and slow transmission speeds triggers data re-transmission in which the billing system usually cannot properly identify or a complicated billing system has to be used. Unnecessary service charges occur as a result and the system does not have the capability to dynamically manipulate these extra charges. Also in the case where wireless subscriber units communicate directly with each other and without use of a call processing server, billing by a flat rate is not efficient. The user of the wireless subscriber unit many times cannot estimate the cost of the service or choose the optimal cost for the service. For example, the user cannot select a slower service for a lower fee.

Moreover, there may be a separate billing system for each service that the wireless subscriber unit is capable of performing and/or each method of communicating i.e. direct point-to-point or through a wireless network. For example, there may be a different billing system for telephone service, dispatch service, and packet data service. These systems are not integrated so that a wireless subscriber unit using all of the services separately or simultaneously can be properly billed for the services.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE EMBODIMENTS

Figure 1:
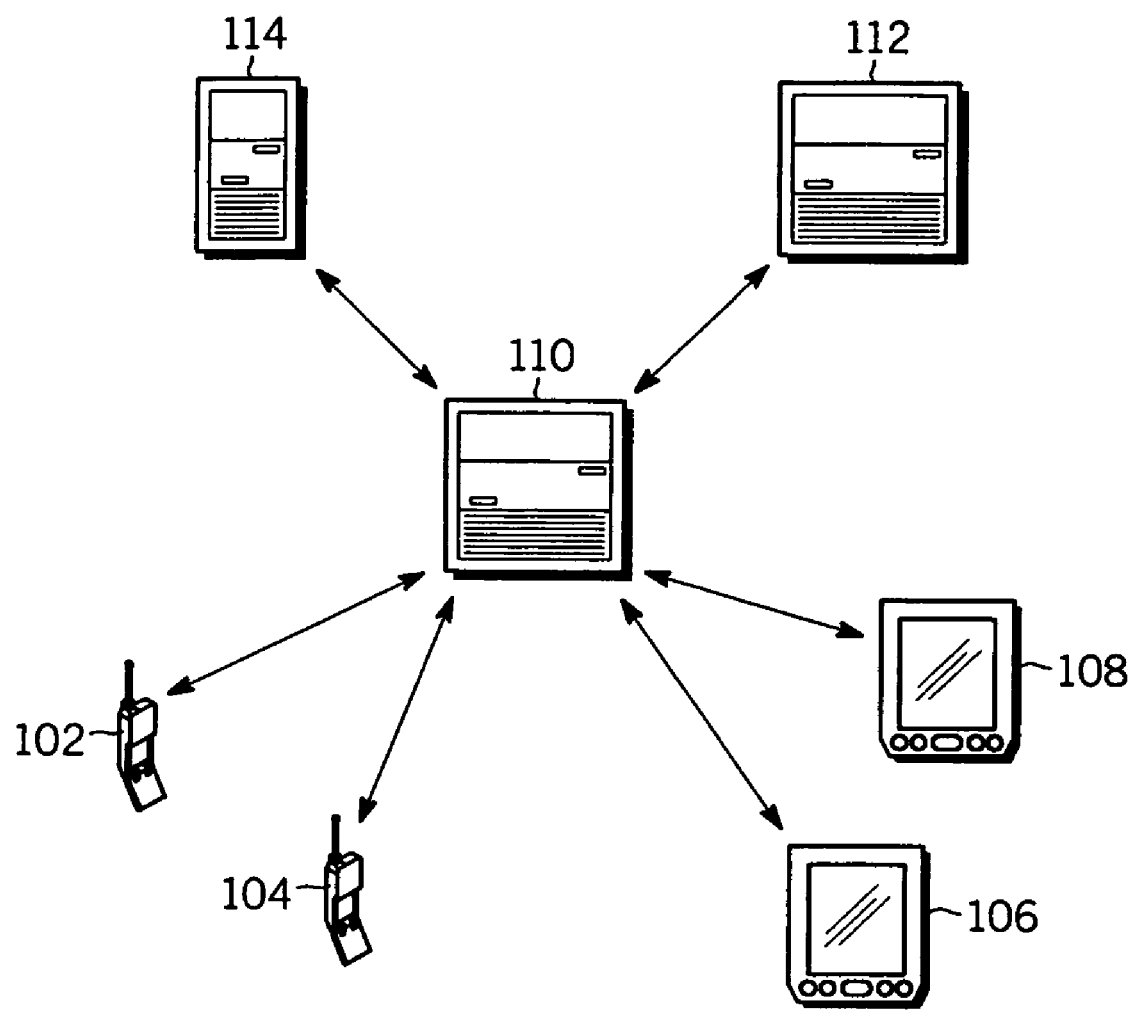
FIG. 1 illustrates a prior art system for a communications system in which wireless subscriber units communicate via a call processing server.
Figure 2:
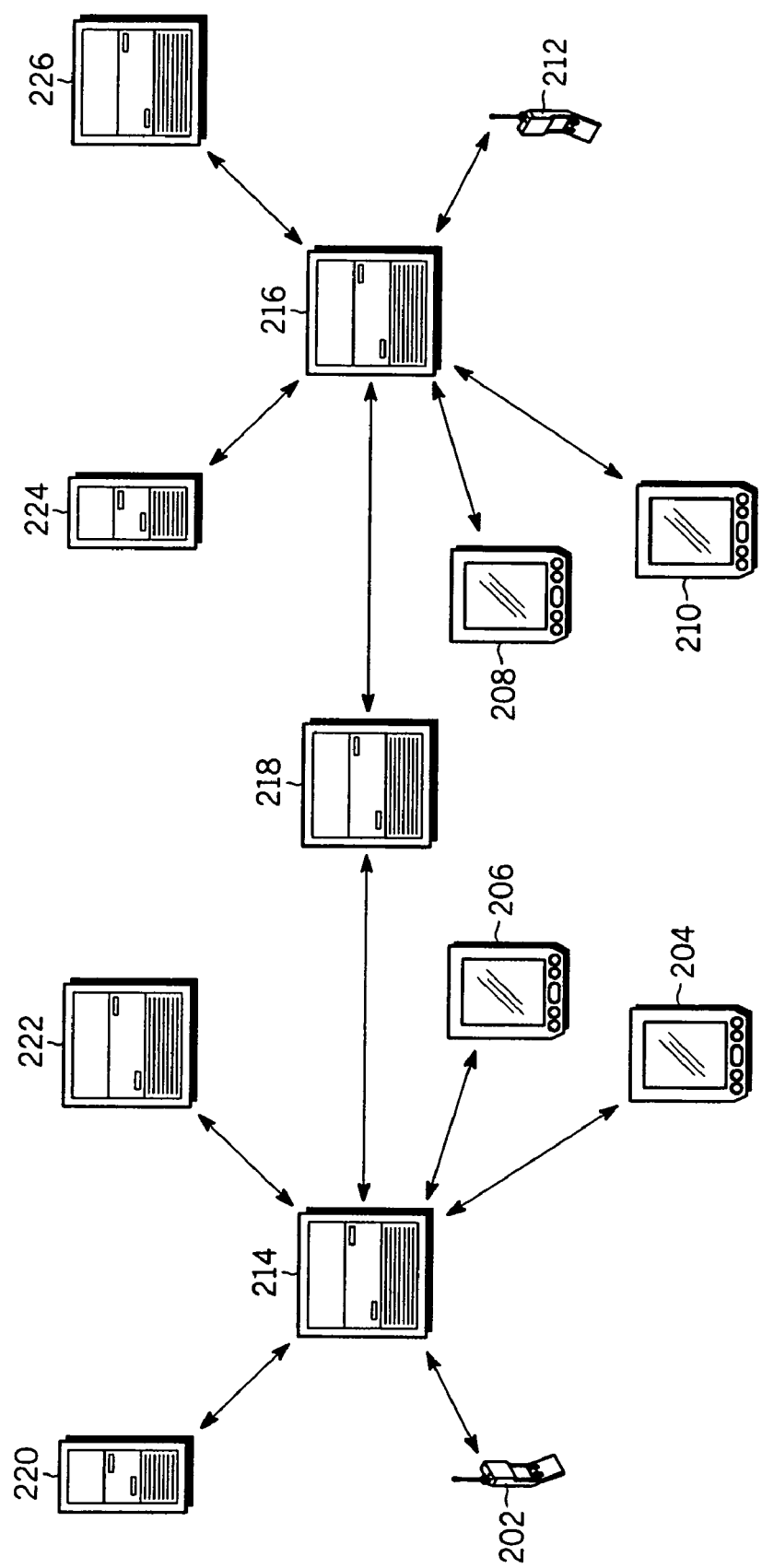
FIG. 2 illustrates a prior art system for a communications system in which wireless subscriber units locate a peer wireless subscriber unit via a proxy server.

Generally speaking, pursuant to these various embodiments, upon receiving an authentication request from a wireless client, a service status of the wireless client is obtained for authentication. When the wireless client has, in fact, been authenticated, an open token is accordingly sent to the wireless client for access to at least one service. In one embodiment, the wireless client is also sent a list of network addresses for any available services. For a specific embodiment, an open token is sent to the wireless client for each of the available services.

According to one embodiment, authentication of the wireless client comprises a determination as to whether the wireless client has been authenticated. If the wireless client has not been authenticated, an attempt to complete authentication is made with the wireless client, followed by a determination whether the authentication with the wireless client was, in fact, successfully. In the case where the authentication was not successful, all services that are accessible to the wireless client through a previously sent open token are stopped.

In an embodiment, the authentication of the wireless client also comprises an attempt to obtain a completion token of any services that were accessible to the wireless client through a previously sent open token, and any service that corresponds to a completion token that cannot be obtained from the wireless client is blocked. According to one embodiment, the authentication of the wireless client also comprises an attempt to negotiate inconsistent billing charges of a service with the wireless client, followed by a determination as to whether a billing acknowledgement of the service has been received from the wireless client. If the billing acknowledgement of the service has not, in fact, been received, the service is the then accordingly blocked.

According to various embodiments, upon receipt of a completion token associated with at least one service that is previously accessible to a wireless client through an open token, a determination is made as to whether at least one other completion token associated with the service has been received from substantially all other wireless clients that previously assessed the service. In an embodiment, collection of the completion token from any other wireless clients is enforced when the at least one other completion token associated with the at least one service has not been received.

If these completion tokens have been received from substantially all of these other wireless clients, these completion tokens are analyzed to generate a billing proposal of the service, which is sent to the wireless client in one specific embodiment. For one embodiment, a further determination is made as to whether a billing acknowledgment has been received from substantially all of the wireless clients that previously accessed the service. If, in fact, these billing acknowledgments have been received, a billing record that is based on the billing acknowledgements is created. In a particular embodiment, a next open token for the service is sent to the wireless client responsive to receiving the completion token from the wireless client.

In one embodiment, a determination is made as to whether any inconsistent billing charges are found based on substantially all of the wireless clients that previously accessed the service. These inconsistent billing charges are accordingly negotiated with the wireless client to be corrected, followed by the billing proposal being sent to the wireless client once these inconsistent billing charges have been successfully negotiated.

According to various embodiments, upon receipt of an open token for a service from a billing server, a peer-to-peer communication with a wireless client is initiated using the service. The status of the service is tracked to generate billing charges for usage of the service, and a completion token having the status of the usage of the service is sent to the billing server. For one specific embodiment, it is further determined whether the peer-to-peer communication with the wireless client has been terminated, and the status of the service is continuously tracked until the peer-to-peer communication with the wireless client has been terminated. In one embodiment, a next open token for the service is received after the completion token is sent to the billing server. For another particular embodiment, an authentication request is sent to the billing server prior to receiving the open token from the billing server.

According to various embodiments, an apparatus is also provided, which comprises a storage having an open token for at least one service sent from a billing server and a device controller coupled to the storage that initiates a peer-to-peer communication with at least one wireless client using the service. The device controller further tracks a status of the service to generate billing charges for usage of the service. A transmitter coupled to the device controller is also included for sending a completion token having the status of the usage of the service to the billing server.

Through these various teachings, a novel service billing technique has been provided that, among other things, allows the wireless subscriber unit to directly track the usage of multiple services for billing purposes. As a result, any inconsistent billing charges of these services used by multiple subscriber units can be resolved using the tracked usage sent from each subscriber unit. A more efficient and accurate billing system is, thus, provided, while maintaining increased end-to-end security for the wireless subscriber units.

Overview

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 3:
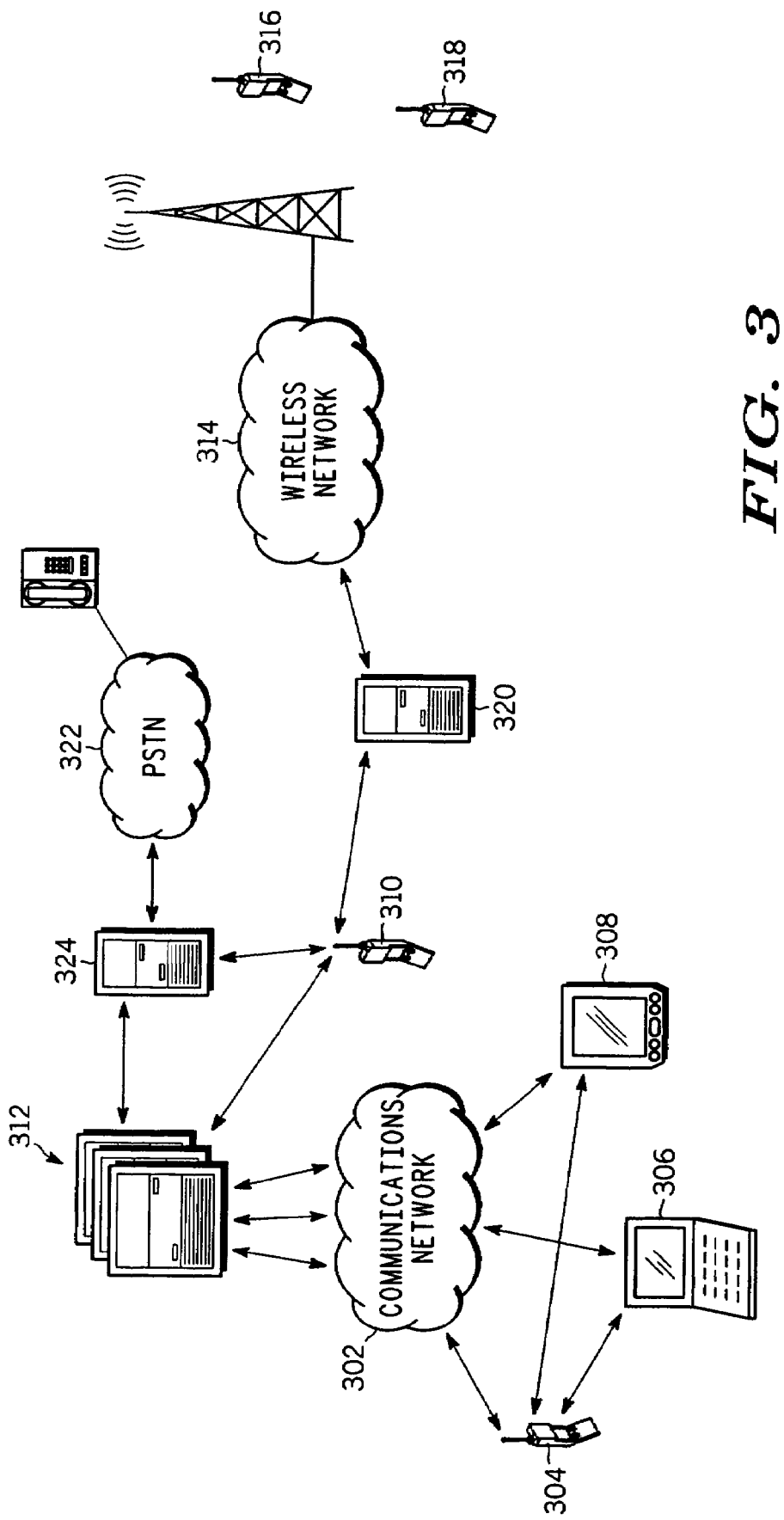
FIG. 3 is a block diagram illustrating a wireless communications system, according to an embodiment of the present invention.

According to an embodiment of the present invention, as shown in FIG. 3, an exemplary wireless communications system 300 is illustrated. FIG. 3 shows a communications network 302 that connects wireless subscriber units 304, 306, 308, 310, also referred to as wireless clients, with a communications system 312. The communications network 302 supports any number of wireless subscriber units or clients 304, 306, 308, 310, which include support for any wireless device capable of point-to-point communications such as Internet Protocol ("IP") based communications and other direct addressable protocols. Since multiple types of wireless subscriber units or clients are contemplated, the wireless subscriber units or clients 304, 306, 308, 310, may have many similar functions to that of computer devices. As such, it should be noted that the wireless clients 304, 306, 308, 310 will be herein used to refer to any device that can utilize services provided by the infrastructure, which includes, but is not limited to, cell phones, mobile stations, personal digital assistants, and/or computers.

Moreover, other types of mobile wireless communications standards are also within the scope of the communications network 302 which are described below. For example, mobile telephones, smart phones, text messaging devices, handheld computers, pagers, beepers, or the like can be supported by the communications network 302. A smart phone is a combination of 1) a pocket PC, handheld PC, palm top PC, or Personal Digital Assistant (PDA); and 2) a mobile telephone. More generally, a smart phone is a mobile telephone that has additional application processing capabilities.

Wireless Communication System

The wireless subscriber units or clients 304, 306, 308, 310 are capable of performing multiple services. For example, the wireless subscriber unit can perform peer-to-peer communication, telephone service communication, packet data communication, or the like.

The wireless communications system 300 also includes a wireless network 314. The wireless network 314 includes a mobile phone network, a mobile text messaging device network, a pager network, or the like. Further, the communications standard of the wireless network 314 comprises Code Division Multiple Access (CDMA), Time Division Multiple Access (TDMA), Global System for Mobile Communications (GSM), General Packet Radio Service (GPRS), Frequency Division Multiple Access (FDMA), Integrated Digital Enhanced Network (iDEN), or the like.

The wireless subscriber units 304, 306, 308, 310 communicate with other wireless subscriber units 316, 318 that are operating in the wireless network 314 through a billing server 320. The billing server 320 is communicatively coupled to the wireless subscriber units 304,306, 308, 310 and the wireless network 314. The billing server 320 provides an interface for the wireless subscriber units 304, 306, 308, 310 to the various communications standards of the wireless network 314. Additionally, in another embodiment, the wireless subscriber units 304, 306, 308, 310 connects to a public switched telephone network ("PSTN") 322 through a proxy server 324, which is communicatively coupled to the communications system 312 and the PSTN 322.

Figure 4:
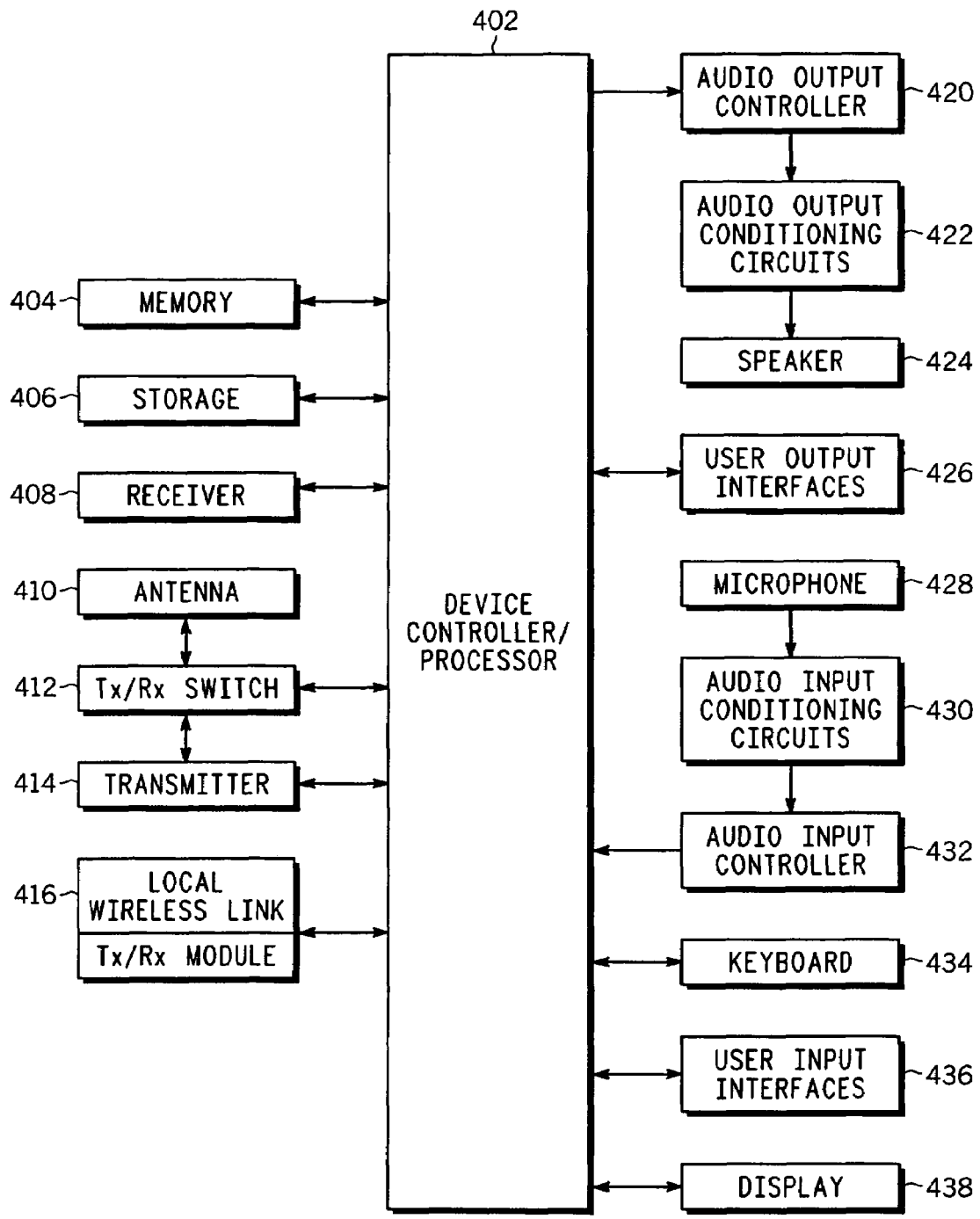
FIG. 4 illustrates an exemplary wireless subscriber unit for a wireless communications system according to an embodiment of the present invention, according to an embodiment of the present invention.

FIG. 4 illustrates an exemplary wireless subscriber unit 304 for a wireless communications system 300. In one embodiment of the present invention, the wireless subscriber unit 304 is a two-way radio capable of receiving and transmitting radio frequency signals over a communication channel under a communications protocol such as CDMA, FDMA, CDMA, GPRS, GSM, or the like.

The wireless subscriber unit 304 operates under the control of a device controller/processor 402, which switches the wireless subscriber unit 304 between receive and transmit modes. In receive mode, the device controller 402 electrically couples an antenna 410 through a transmit/receive switch 412 to a receiver 408. The receiver 408 decodes the received signals and provides those decoded signals to the device controller 402. In transmit mode, the device controller 402 electrically couples the antenna 410, through the transmit/receive switch 412, to a transmitter 414. The device controller 402 operates the transmitter and receiver according to instructions stored in the memory 404. These instructions include a neighbor cell measurement-scheduling algorithm.

FIG. 4 also includes a non-volatile storage module 406 for storing information that may be used during the overall process described herein. For example, a received service data packet (not shown) waiting to be processed by the device controller 402 or a service status table 1002 (not shown) can be stored in the storage module 406.

The wireless subscriber unit 304 also includes a local wireless link 416 that allows the wireless subscriber unit 304, through a local wireless link transmit/receive module 418, to directly communicate with another wireless subscriber unit 306, 308, 310 without using the wireless network 314. The local wireless link 416, for example, is provided by Integrated Enhanced Digital Network (iDEN), Bluetooth, Infrared Data Access (IrDA) technologies or the like.

The wireless subscriber unit 304 further includes an audio output controller 420 that receives decoded audio output signals from the receiver 408 or the local wireless link transmit/receive module 418. The audio controller 420 sends the received decoded audio signals to the audio output conditioning circuits 422 that perform various conditioning functions. For example, the audio output conditioning circuits may reduce noise or amplify the signal. A speaker 424 receives the conditioned audio signals and allows audio output for listening by a user. The wireless subscriber unit 304 further includes additional user output interfaces 426, for example, a head phone jack (not shown) or a hands-free speaker (not shown).

The wireless subscriber unit 304 also includes a microphone 428 for allowing a user to input audio signals into the wireless subscriber unit 304. Sound waves are received by the microphone 428 and are converted into an electrical audio signal. Audio input conditioning circuits 430 receive the audio signal and perform various conditioning functions on the audio signal, for example, noise reduction. An audio input controller 432 receives the conditioned audio signal and sends the signal to the device controller 402.

The wireless subscriber unit 304 also comprises a keyboard 434 for allowing a user to enter information into the wireless subscriber unit 304. In another embodiment, the wireless subscriber unit 304 further comprises additional user input interfaces 436 for example, touch screen technology (not shown), a joystick (not shown), or a scroll wheel (not shown). A display 438, for example, is also included on the wireless subscriber unit 304 for displaying information to the user of the wireless subscriber unit 304.

Figure 5:
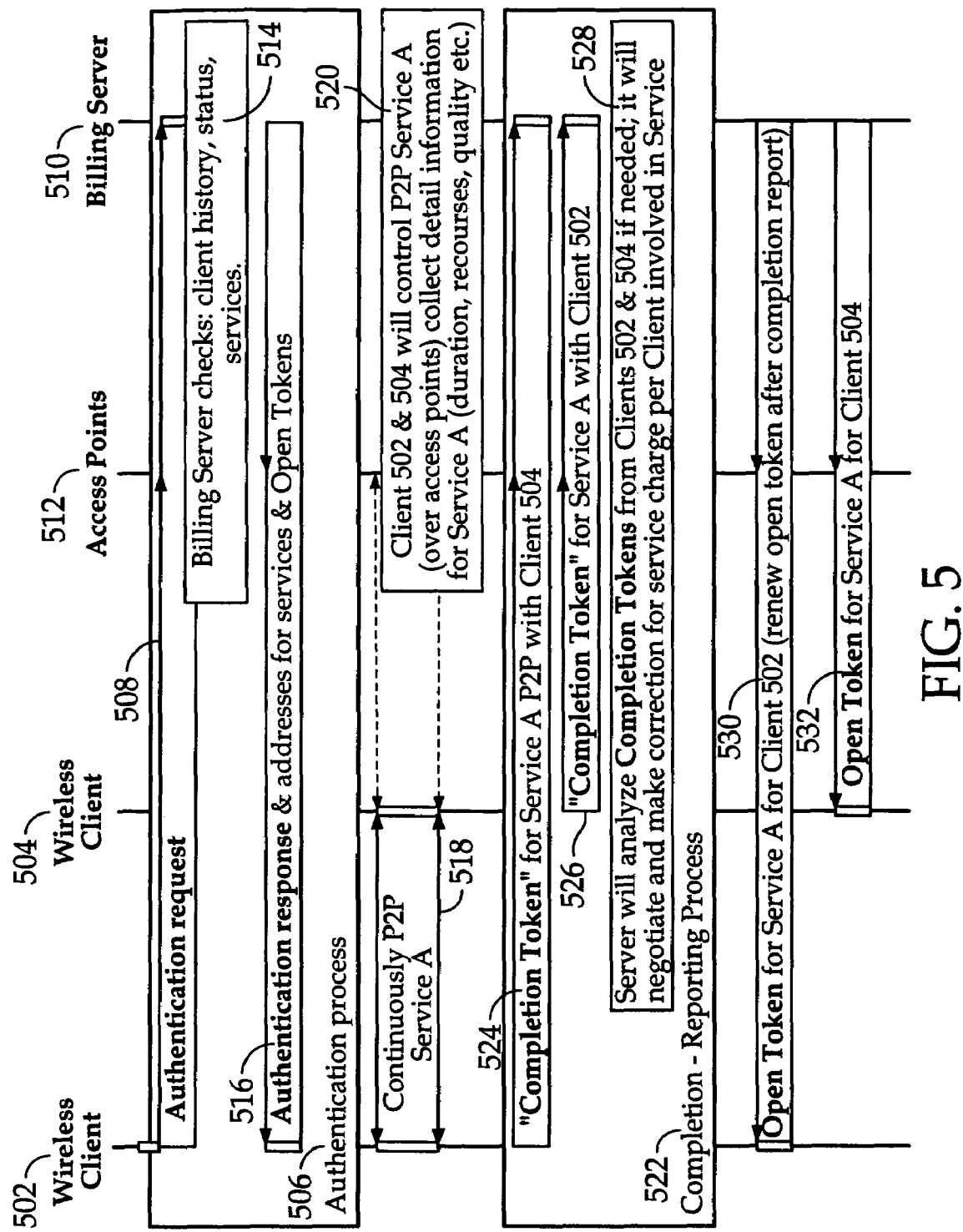
FIG. 5 illustrates an exemplary call diagram of a client registration according to an embodiment of the present invention.

FIG. 5 illustrates an exemplary call diagram of a client registration according to an embodiment, which is indicated generally at numeral reference 500. In order for a wireless client 502 to establish a peer-to-peer communication with a wireless client 504 using a service A, an authentication process 506 must be completed. Specifically, the wireless client 502 initially sends 508 an authentication request to a billing server 510 via its access point 512. Responsive to this authentication request, the billing server 508 obtains 514 previously saved history, status, and services to authenticate the wireless client 502. Assuming the wireless client 502 has been authenticated, the billing server 510 responds 516 with an authentication response, network addresses for one or more available services, and an open token for one or more services. In this particular embodiment shown, although a single open token is preferred for each service, the various teachings contemplates also the use of a single open token being used for multiple services, depending upon the configuration of the system.

Once the wireless client 502 received the open token for service A and assuming the client 504 has also previously received an open token for service A as well, wireless clients 502 and 504 can continuously communicate 518 using peer-to-peer service A as long as the communication link remains between the wireless clients 502 and 504. During the use of peer-to-peer service A, wireless clients 502, 504 have control over the peer-to-peer service A via their corresponding access points 512 and accordingly collects 520 detail information, such as, but is not limited to, duration, recourses, quality, and like, for service A.

Assuming at some point wireless client 502 terminates the use of service A with wireless client 504, wireless client 502 initiates a completion-reporting process 522 by sending 524 a completion token with the previously tracked detail information for service A with wireless client 504. Similarly, a completion token is also expected and sent 526 from the wireless client 504 for service A with wireless client 502. After receiving the completion tokens from both the wireless clients 502 and 504, the billing server 510 accordingly analyzes 528 these completion tokens and if needed, it will negotiate and make correction for service charges based on the clients involved in service A. At any time after receiving the completion token from the wireless clients 502 or 504, respectively, the billing server 510 can send 530, 532 an open token back to the wireless clients 502 or 504 to renew the use of service A.

Figure 6:
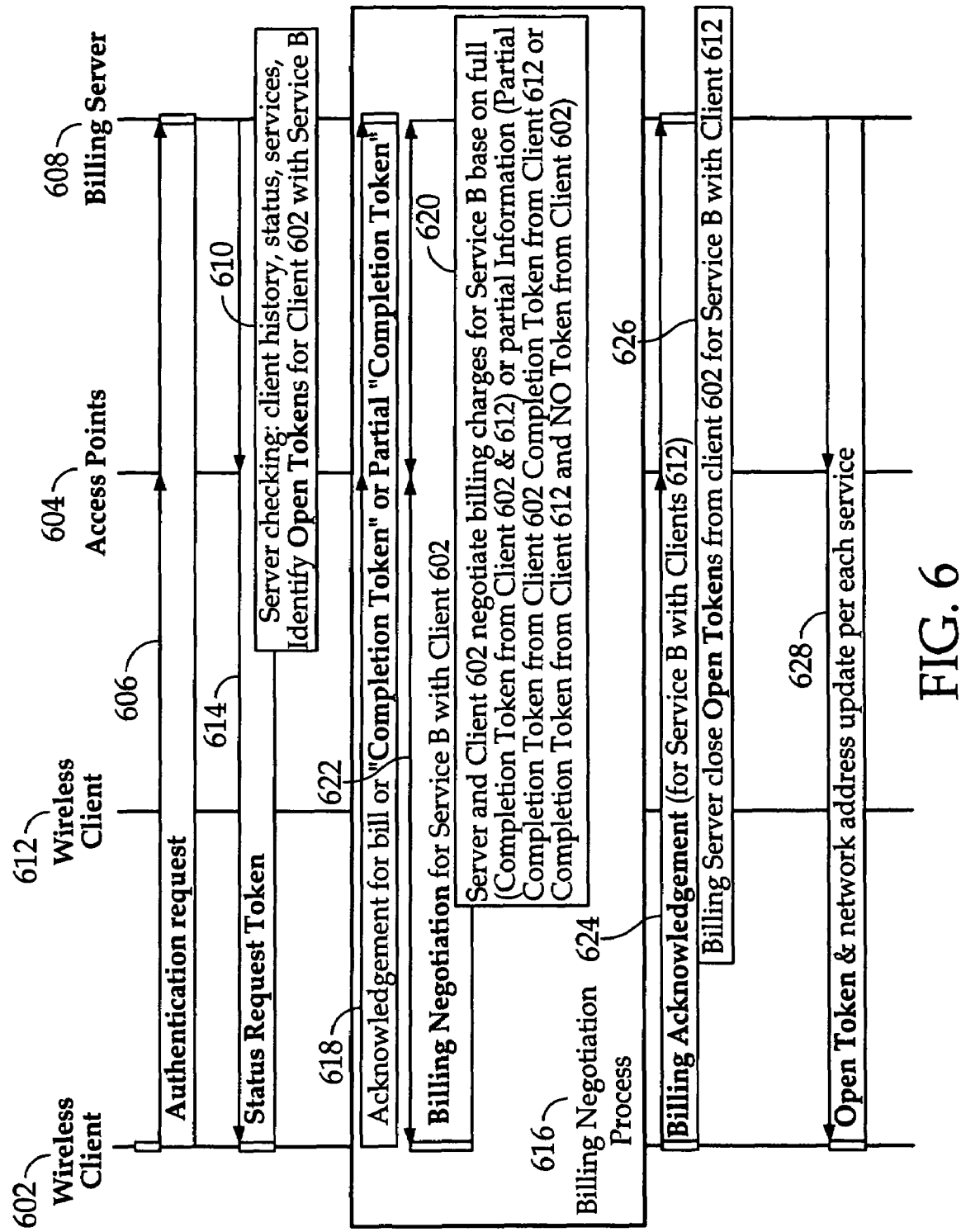
FIG. 6 illustrates an exemplary call diagram of an open token negotiation according to an embodiment of the present invention.

Turning now to FIG. 6, an exemplary call diagram of an open token negotiation according to an embodiment is shown and indicated generally at numeral reference 600. As an example, a wireless client 602, via its corresponding access point 604, sends 606 an authentication request to a billing server 608. Assuming the billing server 608, after checking 610 the client's history, status, and services, identifies an open token that was sent to the wireless client 602 for service B with wireless client 612. In this case, since the billing server 608 recognizes that an open token was previously sent to the wireless client 602, the billing server 608 sends 614 a status request token to the wireless client 602 to obtain either a billing acknowledgement and/or completion token depending upon whether a billing proposal has been previously sent to the wireless client 602. A billing negotiation process 616 is initiated with a response to the status request token from the wireless client 602.

Depending upon the state of the billing process for service B, the wireless client 602 may reply 618 with a bill acknowledgement, a completion token, or a partial completion token. According to this embodiment, a completion token is sent when the use of service was not terminated unexpectedly caused by interrupted service, such as a dropped call. If the completion token is sent, the tracked usage of service B by wireless client 602 would be included. A partial completion token, on the other hand, is sent when there has been interruption of the service. Specifically, since the service was interrupted unexpectedly, the complete accounting of the service cannot be tracked. As a result, a partial completion token having partial accounting of the service is sent to the billing server 608. For the billing acknowledgement, this is the final step when the wireless client 602 indicates that the billing proposal that was previously sent by the billing server 608 is accepted and confirmed.

In this example shown, assuming that a billing acknowledgement was not sent from either the wireless client 602 or the wireless client 612, three possible scenarios 620 of the billing charges negotiation 622 between the wireless client 602 and billing server 608 for service B are possible. In particular, the billing server 608 may have completion tokens from both the wireless clients 602 and 612, which would be the normal case with no interrupted service. For this case, billing proposal will be accurate since the completion tokens can be cross-referenced for consistency. The next scenario is when a completion token is received from one of the wireless clients, for example client 612, and a partial completion token from the other wireless client 602. In this case, the completion token from client 612 can be used to account for any missing information from the partial completion token. Again, this way, a more accurate billing proposal can be produced with minimal negotiation with the user of the wireless clients. In the next case of the billing server 608 having only a completion token from client 612 and no token from client 602 would be one of the worst case scenarios. In this case, the billing server 608 would likely send a billing proposal to wireless client 602 based on the completion token from client 612.

Of course, there are other scenarios that are not shown that cannot be used to generate a complete billing proposal because the usage information is simply missing. For example, if only two partial completion tokens are available, the billing proposal may generate a billing proposal that includes billing charges that are consistent between the two partial completion tokens and disregard the missing usage information. For the remaining cases having a partial completion token and no token or no tokens from the wireless clients, human intervention may be required to generate these missing billing charges. The occurrence of these case scenarios, however, would likely be so rare that it should be a minimal effect, if any, on the billing system.

Assuming that a billing proposal, based on the billing charges of these tokens, is sent to the wireless client 602 from the billing negotiation 622, a billing acknowledgement for service B with wireless client 612 should be sent 624 from the wireless client 602. Once this billing acknowledgement is received, the billing server 608 accordingly closes the open tokens from client 602 for service B with client 612. In this embodiment shown, an open token along with the network addresses would again be sent 628 for each service in order for the wireless client 602 to access these services.

Figure 7:
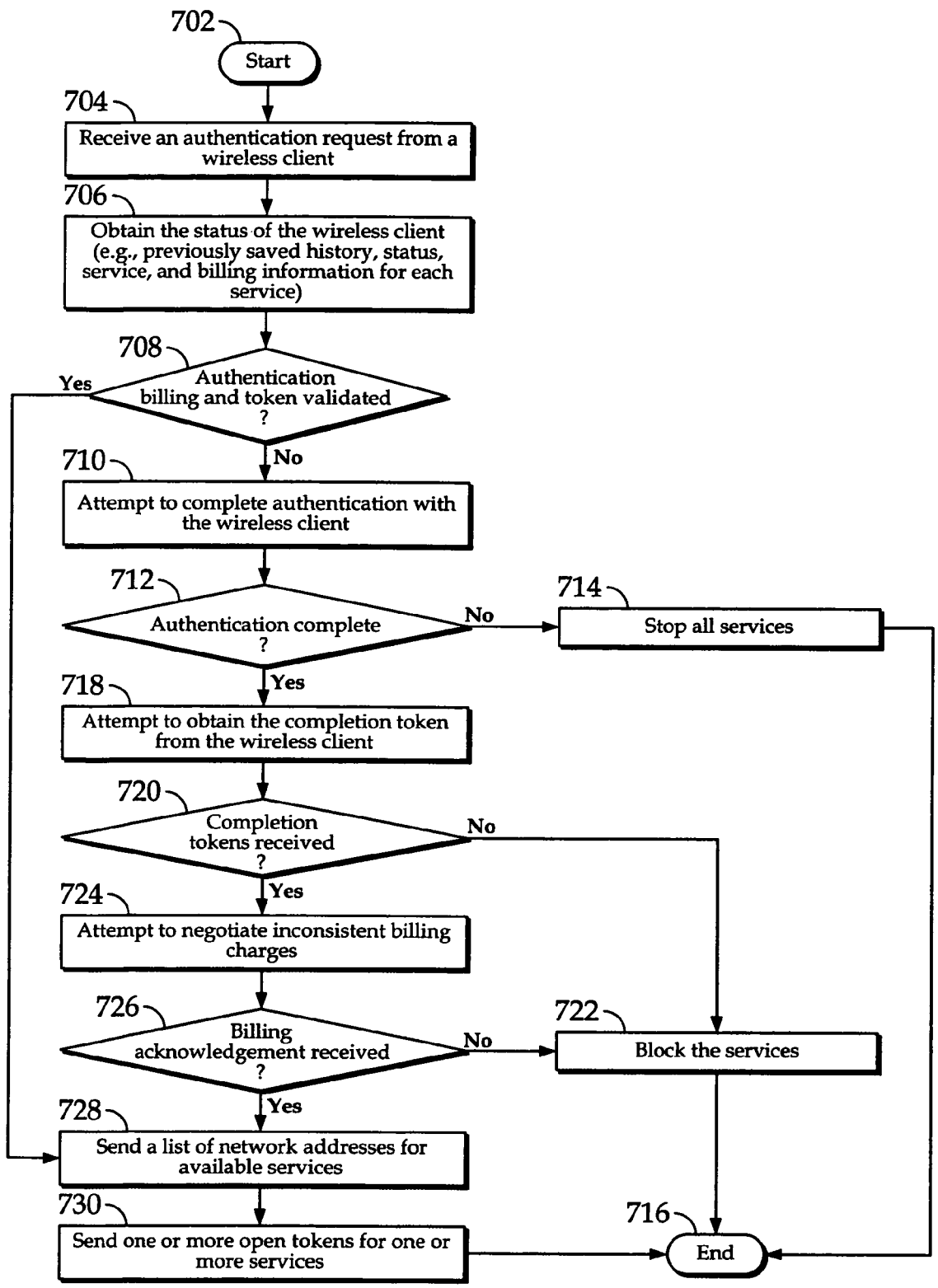
FIG. 7 illustrates a flow chart of a client diagram registration process implemented at a billing server according to an embodiment of the present invention.

Referring now to FIG. 7, a flow chart diagram of a client registration process implemented at a billing server according to one embodiment is shown and indicated generally at numeral reference 700. Although the process shown is preferably implemented at the billing server, there may be other implementations that are better suited for in the communications system. As a skilled artisan would readily appreciate, the flow diagram may be altered according to these different implementations. And as such, other embodiments of the client registration process are contemplated and are within the scope of the various teachings shown.

These processes, as shown, can be implemented fully or partially at any components, such as the billing server and/or wireless clients. Moreover, as one skilled in the art can readily appreciate, any of the processes shown can be altered in multiple ways to achieve the same functions and results of the various teachings described. As a result, these processes shown are one exemplary embodiment of multiple variation embodiments that may not be specifically shown. These other embodiments, however, are within the scope of the various teachings described.

In this particular example shown, the client registration process 700 is initiated 702 with the receipt 704 of an authentication request from the wireless client. Responsive to this authentication request, a status of the wireless client, such as previously saved history, status, service, and billing information, is obtained 706 to authenticate the billing and validate any open tokens. Specifically, it is determined 708 whether the billing and open tokens have been, in fact, been authenticated and validated, respectively. If not, for example, there are then open issues with billing charges and/or missing completion tokens. In response, the process 700 attempts 710 to complete authentication with the wireless client, followed by a determination 712 as to whether the authentication of the wireless client has, in fact, been completed. If authentication fails 712, any services that were previously accessible through an open token sent to the wireless client would be stopped 714, and the process 700 ends 716 at this point.

If, on the other hand, the wireless client has been successfully authenticated, the process 700 then attempts 718 to obtain any missing completion token from the wireless client, followed by another determination 720 whether any completion tokens that were not accounted for has been received. In other words, before any new open tokens can be sent to the wireless client, the previously sent open tokens that were not properly accounted for must be resolved. If these completion tokens are not received 720, the process 700 accordingly blocks 722 any of the services with the missing completion token, which ends 716 the process at this point.

If, however, these missing completion tokens have been successfully retrieved 720 from the wireless client, an attempt 724 is made to negotiate any inconsistent billing charges based on these completion tokens by, for example, sending a billing proposal to the wireless client and waits for a billing acknowledgement. The process 700 then determines 726 whether the billing acknowledgement has been received from the wireless client, and if not, meaning some of the open tokens have not been accounted for, the services with the missing completion tokens will be blocked 722. Otherwise, on the other hand, if billing acknowledgement for any outstanding open tokens have been received 726, a list of network addresses for available services along with their corresponding open tokens are sent 728, 730 to the wireless client, and the process 700 is completed 716 at this point with the client all registered and ready to use these services.

Figure 8:
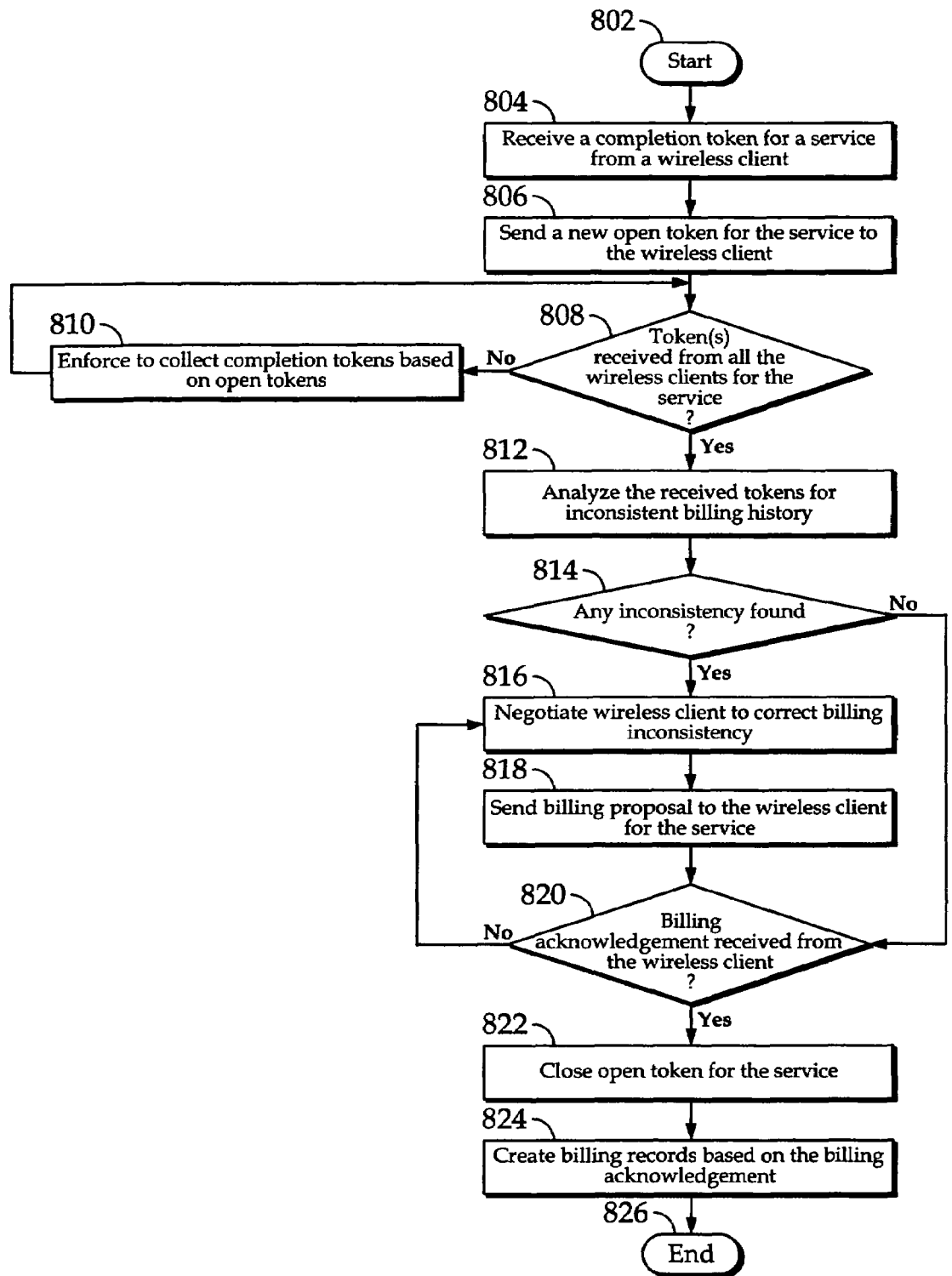
FIG. 8 illustrates a flow chart diagram of a billing negotiation process implemented at a billing server according to an embodiment of the present invention.

Turning to FIG. 8, a flow chart of a billing negotiation process implemented at a billing server according to an embodiment is shown and indicated generally at numeral reference 800. The billing negotiation process 800 starts 802 with a receipt 804 of a completion token for a service from a wireless client. In this embodiment shown, a new open token for access to the service is preferably sent 806 to the wireless client before any billing negotiation begins. Of course, other embodiments of sending the open token only after the billing negotiation and/or a resolution of the billing negotiation are also contemplated and are within the scope of the various teachings shown.

Since the service may have been used with other wireless clients, as well, the process 800 next determines 808 whether completion tokens or partial completion tokens have been received from all of the wireless clients that utilized the service with the wireless client that sent the completion token. If not, the process 800 enforces 810 collection of these completion tokens from these other wireless clients based on open tokens for the service that were previously sent. Once either the completion tokens or partial completion tokens are received 808 from all of the other wireless clients that utilized the service with this wireless client, it is then determined 814 whether any inconsistent billing charges have been found based on these completion tokens. If there are, in fact, inconsistent billing charges, the process 800 accordingly negotiates 816 with the wireless client to resolve these inconsistencies and accordingly sends 818 a billing proposal to the wireless client for the service.

Once these inconsistencies have been eliminated either from the completion tokens or billing negotiations, it is next determined 820 whether a billing acknowledgement has been received from the wireless client in response to the billing proposal. If such a billing acknowledgement has not been received, the process 800 continues to loops back to negotiate 816 with the wireless client and resend the billing proposal. Assuming a billing acknowledgement has been received from the wireless client, the process 800 closes 822 the open token corresponding to the service that was previously sent having the billing charges and accordingly creates 824 billing records based on the billing acknowledgement from the wireless client, which completes 826 the process at this juncture.

Figure 9:
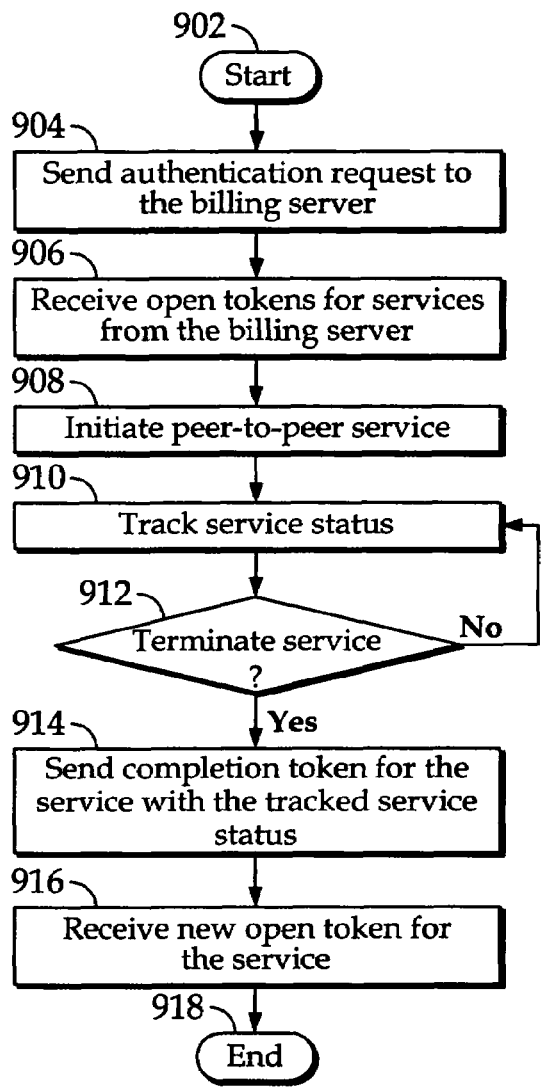
FIG. 9 illustrates a flow chart diagram of tracking process implemented at a wireless client according to an embodiment of the present invention.

Turning to FIG. 9, a flow chart of tracking process implemented at a wireless client according to an embodiment is shown and indicated generally at numeral reference 900. This process 900 is initiated 902 initially with a sending 904 of an authentication request to the billing. In this embodiment, the process 900, in response, receives 906 open tokens for services from the billing server, assuming the wireless client has been authenticated and any open tokens have been validated. The user of the wireless client can now proceed to use any of the services via the open tokens received be initiating 908 a specific service, such as a peer-to-peer service. The process 900, as a result, begins tracking 910 the service status of the usage and billing charges until the service has been terminated 912. After which, a completion token having the tracked service status is sent 914 to the billing server, which should be followed shortly with a receipt 916 of a new open token for access to the same service. The process ends 918 at this point.

Figure 10:
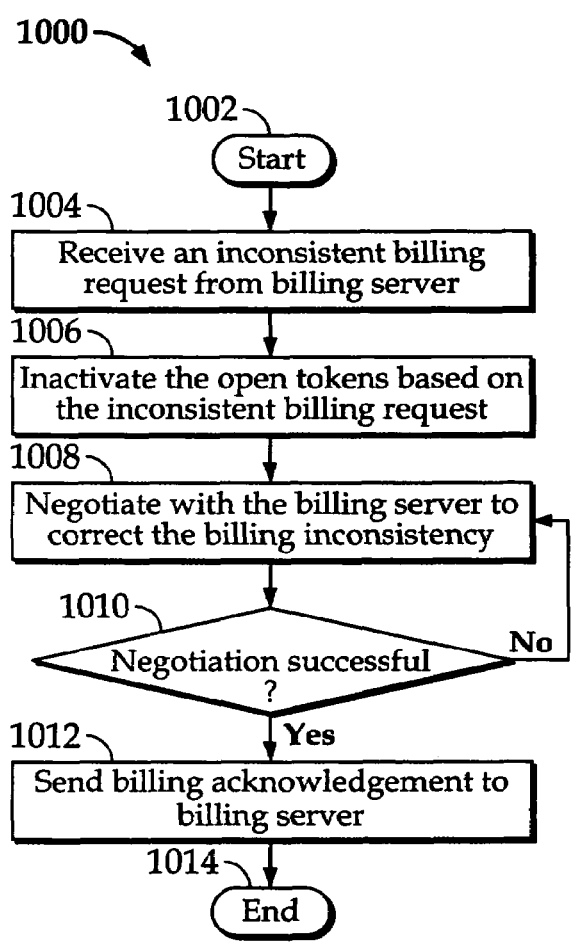
FIG. 10 illustrates a flow chart diagram of billing negotiation process implemented at a wireless client according to an embodiment of the present invention.

Referring now to FIG. 10, a flow chart of billing negotiation process implemented at a wireless client according to one embodiment is shown and indicated generally at numeral reference 1000. The billing negotiation process 1000 starts 1002 by receiving 1004 an inconsistent billing request from the billing server, and responsive to this request, any open tokens based on the inconsistent billing request is inactivated 1006. The process 1000 begins negotiation 1008 with the billing server to correct any billing inconsistency and determines 1010 whether the negotiation was, in fact, successful. In this embodiment shown, the process 1000 continuous to negotiate 1008 until there is a successful outcome of the negotiation. A billing acknowledgement is then sent 1012 to the billing server, which ends 1014 the process 1000 at this point.

Figure 11:
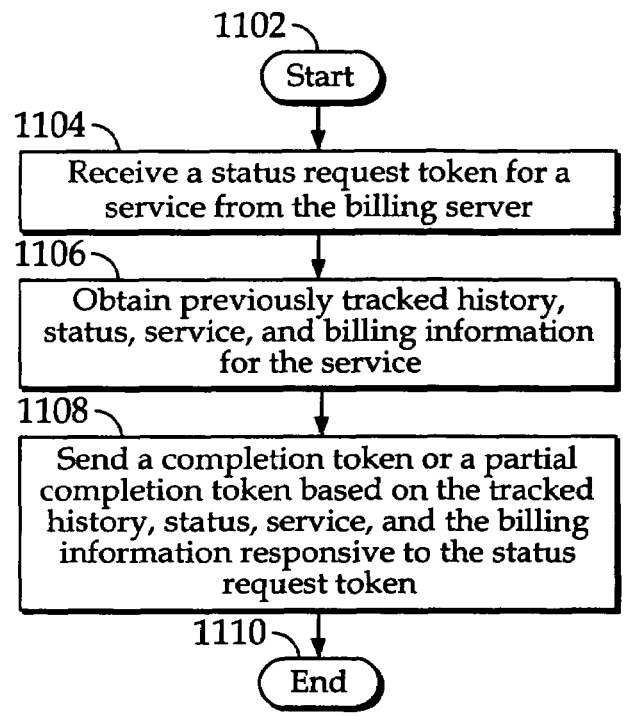
FIG. 11 illustrates a flow chart of a status response process implemented at a wireless client according to an embodiment of the present invention.

Turning now to FIG. 11, a flow chart of a status response process implemented at a wireless client according to an embodiment is shown and indicated generally at 1100. The process 1100 starts 1102 with a receipt 1104 of a status request token for a service from the billing server, and responsive to this token, previously tracked history, status, service, and/or billing information for the service are obtained 1106. Based on this information obtained, either a completion token or a partial completion, depending upon whether the tracked information was complete, is then sent 1108 to the billing server.

Figure 12:
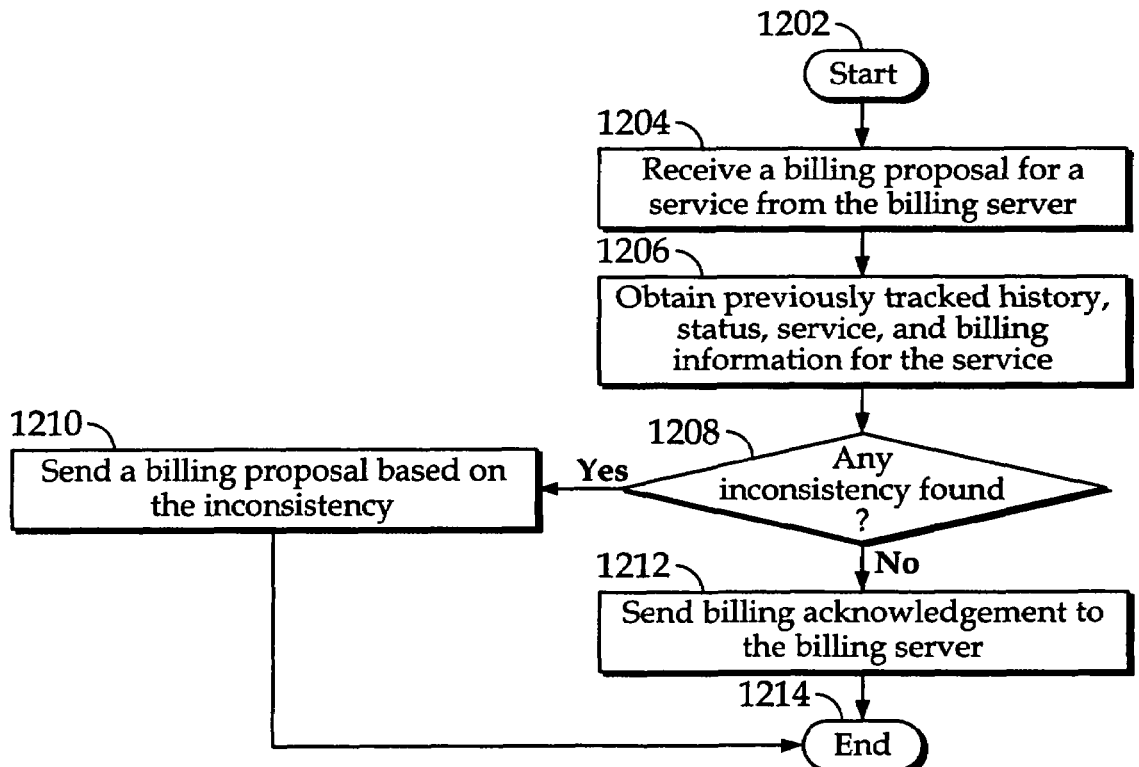
FIG. 12 illustrates a flow chart of a billing acknowledgement process implemented at a wireless client according to an embodiment of the present invention.

Referring to FIG. 12, a flow chart of a billing acknowledgement process implemented at a wireless client according to an embodiment is shown and indicated generally at 1200. In this process 1200, it is initiated 1202 with a receipt 1204 of a billing proposal for a service from the billing server. Responsive this billing proposal, previously tracked history, status, service, and billing information for the service are obtained 1206 to determine 1208 whether there is any inconsistency for the billing charges of the service. If there are inconsistencies found, a billing proposal including any inconsistencies is sent 1210 back to the billing server. Otherwise, a billing acknowledgement is sent 1212 to the billing server when there is no inconsistency. The process 1200 accordingly ends 1214 at this point.

Through these various teachings, a novel service billing technique has been provided that, among other things, allows the wireless subscriber unit to directly tack the usage of multiple services for billing purposes. As a result, any inconsistent billing charges of these services used by multiple subscriber units can be resolved using the tracked usage sent from each subscriber unit. A more efficient and accurate billing system is, thus, provided, while maintaining increased end-to-end security for the wireless subscriber units.

Computer Program Product

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Non-Limiting Examples

Although specific embodiments of the invention have been disclosed, those having ordinary skill in the art will understand that changes can be made to the specific embodiments without departing from the broad scope of the invention. The scope of the invention is not to be restricted, therefore, to the specific embodiments, and it is intended that the appended claims cover any and all such applications, modifications, and embodiments within the scope of the present invention.

Furthermore, it is intended that the appended claims cover any and all such applications, modifications, and embodiments within the scope of the present invention.

What is claimed is:

1. A method for generating service billing records, comprising the steps of:
receiving an authentication request from a wireless client;
obtaining a service status of the wireless client;
determining whether the wireless client has been authenticated;
attempting to complete authentication with the wireless client when the wireless client has not been authenticated;
determining whether authentication with the wireless client was successful;
sending an open token to the wireless client for access to at least one service when the wireless client has been authenticated; and
stopping all services that are accessible to the wireless client through a previously sent open token when the authentication with the wireless client was not successful.

2. The method as defined in claim 1 further comprising the step of:

sending the wireless client a list of network addresses for available services.

3. The method as defined in claim 1, wherein sending an open token to the wireless client comprises sending an open token to the wireless client for each available service.

4. The method as defined in claim 1, wherein authenticating the wireless client based on the service status further comprises the steps of:
attempting to negotiate an inconsistent billing charge of a service with the wireless client;
determining whether a billing acknowledgement of the service has been received from the wireless client;
blocking the service when the billing acknowledgment of the service has not been received from the wireless client.

5. The method as defined in claim 1 further comprising the steps of:
receiving a completion token associated with at least one service previously accessible to a wireless client through an open token;
determining whether at least one other completion token associated with the at least one service has been received from substantially all other wireless clients that previously accessed the service;
analyzing the completion tokens to generate a billing proposal of the at least one service when the completion tokens have been received from substantially all the wireless clients that previously accessed the at least one service.

6. The method as defined in claim 5 further comprising the step of:
sending the billing proposal to the wireless client.

7. The method as defined in claim 5 further comprising the steps of:
determining whether a billing acknowledgement has been received from substantially all of the wireless clients that previously accessed the at least one service;
creating a billing record based on the billing acknowledgements from substantially all of the wireless clients that previously accessed the at least one service.

8. The method as defined in claim 5 further comprising the step of:
sending a next open token for the at least one service to the wireless client responsive to receiving the completion token.

9. The method as defined in claim 5 further comprising the step of:
enforcing collection of the completion token from any other wireless clients when the at least one other completion token associated with the at least one service has not been received.

10. The method as defined in claim 5 further comprising the steps of:
determining whether any inconsistent billing charges are found based on substantially all of the wireless clients that previously accessed the at least one service;
negotiating with a wireless client having the inconsistent billing charges to correct the inconsistent billing charges.

11. The method as defined in claim 10 further comprising the step of:
sending the billing proposal to the wireless client once the inconsistent billing charges have been successfully negotiated.

12. A system for generating service billing records, comprising:
a billing server that receives an authentication request from a wireless client, obtains a service status of the wireless client, determines whether the wireless client has been authenticated, attempts to complete authentication with the wireless client when the wireless client has not been authenticated, determines whether authentication with the wireless client was successful, sends an open token to the wireless client for access to at least one service when the wireless client has been authenticated, and stops all services that are accessible to the wireless client through a previously sent open token when the authentication with the wireless client was not successful;
a storage for holding an open token, sent from the billing server, for at least one service;
device controller coupled to the storage, wherein the device controller initiates a communication with at least one wireless client using the at least one service and tracks a status of the at least one service to generate billing charges for the at least one service; and
a transmitter coupled to the device controller, wherein the transmitter sends a completion token having the status of the at least one service to the billing server.

* * * * *